(12) United States Patent
Fallais et al.

(10) Patent No.: US 7,423,092 B2
(45) Date of Patent: Sep. 9, 2008

(54) RADIATION-CURABLE COMPOSITIONS FOR PIGMENTED INKS

(75) Inventors: Isabelle Fallais, Braine L'Alleud (BE); Luc Lindekens, Merchtem (BE); Paul Gevaert, Geraardsbergen (BE)

(73) Assignee: Cytec Surface Specialties, SA, Brussels (BE)

( * ) Notice: Subject to any disclaimer, the term of this patent is extended or adjusted under 35 U.S.C. 154(b) by 14 days.

(21) Appl. No.: 10/561,813

(22) PCT Filed: Aug. 26, 2004

(86) PCT No.: PCT/EP2004/009517

§ 371 (c)(1),
(2), (4) Date: Dec. 21, 2005

(87) PCT Pub. No.: WO2005/021666

PCT Pub. Date: Mar. 10, 2005

(65) Prior Publication Data

US 2006/0183868 A1    Aug. 17, 2006

(30) Foreign Application Priority Data

Aug. 27, 2003    (EP) ................... 03019345

(51) Int. Cl.
*C08F 261/02* (2006.01)
*C08F 257/02* (2006.01)
*C08J 3/28* (2006.01)

(52) U.S. Cl. ............... 525/333.3; 525/298; 525/303; 525/305; 525/312; 525/313; 525/328.8; 525/330.3; 525/384; 525/385; 525/386; 522/142; 522/143; 522/144; 522/160

(58) Field of Classification Search ................. 525/298, 525/303, 305, 312, 313, 333.3, 328.8, 330.3, 525/384, 385, 386; 522/142, 143, 144, 160
See application file for complete search history.

(56) References Cited

U.S. PATENT DOCUMENTS 5,049,623 A * 9/1991 Dupont ....................... 525/293

FOREIGN PATENT DOCUMENTS

| DE | 19 57 358 A | 8/1970 |
| GB | 941 305 A | 11/1963 |
| GB | 941305 | * 11/1963 |

OTHER PUBLICATIONS

Database WPI Section Ch, Week 197452, Derwent Publications Ltd., Class A13, AN 1974-89481V XP002265686 (abstract of JP 49 094788, Sep. 9, 1974).
Scherzer, T. et al., "Photoinitiator-freie UV-Härtung von Acrylaten" Institut für Oberflächenmodifizierung E. V.-Tätigkeitsbericht 2001/01 Feb. 18, 2003, XP002265684.
"Non Irritation Acrylates for UV/EB Curing" Sartomer Application Bulletin, Oct. 1999, XP002265685.
"Acrylate-functional styrene-allyl alcohol copolymers useful for energy-curable coatings" Research Disclosure, Kenneth Mason Publications, vol. 436, No. 89, Aug. 2000, XP 007126636.

* cited by examiner

*Primary Examiner*—Roberto Rábago
(74) *Attorney, Agent, or Firm*—Wenderoth, Lind & Ponack, L.L.P.

(57) ABSTRACT

The present invention relates to radiation-curable compositions useful as ink vehicles or inks, in particular UV-curable inks, such as UV-litho inks, comprising a (meth)acrylated styrene allyl alcohol copolymer obtained from the (meth)acrylation of a styrene allyl alcohol (SAA) copolymer with (meth)acrylic acid and/or one or more alkyl(meth)acrylates, and at least one alkoxylated acrylated monomer.

11 Claims, No Drawings

RADIATION-CURABLE COMPOSITIONS FOR PIGMENTED INKS

The present invention relates to radiation-curable compositions useful as ink vehicles or inks, in particular UV-curable inks, such as UV-litho inks.

UV-litho inks based on fatty acid modified polyester acrylate have been used since the 70ies with increasing success. Compared to conventional ink systems UV-inks exhibit faster curing versus oxidative drying and provide an easier printing process because of no drying on the rollers, which leads to short start-up times and less waste. However, fatty acid modified polyester acrylate-based inks still show several performance shortcomings compared to conventional ink systems like the ink-water balance (lack of ink-water emulsion stability on press), pigment wetting (lack of flow in ink duct), higher tack (picking) and higher misting, especially at higher press speeds.

A process for coating articles wherein a polymerizable prepolymer blend of an unsaturated ester of a vinyl aromatic hydrocarbon unsaturated alcohol copolymer such as styrene/allyl alcohol copolymer and a polymerizable interpolymer ester such as an unsaturated ester of a styrene/hydroxyalkyl acrylate/alkyl acrylate terpolymer is applied to the surface of the article to be coated and the prepolymer blend polymerized to form the coating using ionizing radiation is disclosed in U.S. Pat. No. 3,546,002.

U.S. Pat. No. 4,045,516 describes styrene-allyl alcohol copolymer-based solid polyene compositions which when mixed with liquid polythiols can form solid curable polyene-polythiol systems. These solid polyenes, containing at least two reactive carbon-to-carbon unsaturated bonds, are urethane or ester derivatives of styrene-allyl alcohol copolymers.

French patent number 2.168.623 discloses styrene allyl alcohol copolymer-based urethane acrylates. The allylic hydroxyls are reacted with diisocyanate and capped with hydroxy acrylates.

JP 49-94788 discloses the synthesis of styrene allyl alcohol (SAA) acrylates diluted in trimethylolpropane trimethacrylate (TMPTA) as UV vehicles for printing inks.

While the known UV-litho inks exhibit good performance in some of their parameters, there is still a need for further ink vehicles and inks having improved properties such as an improved water balance, an improved pigment wetting and/or an improved cure speed. The subject inventors have now surprisingly found that if (meth)acrylated SAA copolymer-based radiation-curable ink vehicles or inks are diluted with an alkoxylated (meth)acrylated monomer instead of a (meth)acrylated monomer such as TMPTA, water balance, pigment wetting and/or cure speed of the obtained ink vehicle or ink are improved.

Therefore, the present invention relates to a radiation-curable composition comprising (a) at least one (meth)acrylated styrene allyl alcohol copolymer resulting from the reaction of a styrene allyl alcohol copolymer (SAA) with (met)acrylic acid and/or one or more alkyl(meth)acrylates, and (b) at least one alkoxylated (met)acrylated monomer.

SAA copolymers are known in the art. By SAA copolymers it is intended to designate copolymers having units derived from allyl alcohol and units derived from styrene. SAA copolymers are for example produced by Lyondell via a radical polymerization of styrene and allyl alcohol as shown in the following scheme:

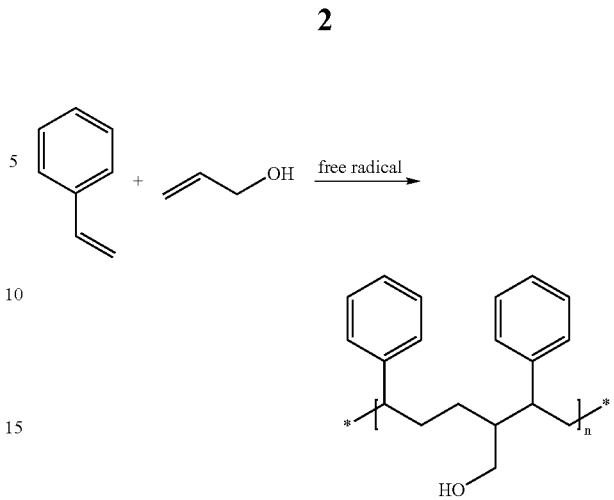

A process for making allylic/alkylenic copolymers is for example disclosed in WO 99/62969.

SAA copolymers are commercially available from Lyondell in three grades, SAA-100, SAA-101 and SAA-103. The properties of these copolymers which are preferred for the preparation of the present compositions are summarized in the following table 1.

TABLE 1

|  | SAA-100 | SAA-101 | SAA-103 |
|---|---|---|---|
| Composition |  |  |  |
| Styrene mole % | 70 | 60 | 80 |
| Allyl alcohol mole % | 30 | 40 | 20 |
| Physical properties |  |  |  |
| Physical form | Pastilles | Pastilles | Pastilles |
| color, Apha(30% in MEK) | 40 | 40 | 40 |
| Mn, GPC | 1500 | 1200 | 3200 |
| Mw, GPC | 3000 | 2500 | 8400 |
| Pd | 2 | 2.1 | 2.6 |
| OH number, mg KOH/g | 210 | 255 | 125 |
| Acid number, mg KOH/g | <0.1 | <0.1 | <0.1 |
| Tg, ° C. | 62 | 57 | 78 |
| Softening point, ° C. | 79 | 73 | 90 |

The hydroxyl groups of the SAA copolymers are stable to acids and bases and easily converted to (meth)acrylate by direct esterification with (meth)acrylic acid or by transesterification with an alkyl(meth)acrylate. The SAA copolymer can for example be dissolved in toluene and then reacted with acrylic acid or methacrylic acid under known process parameters as exemplified in the following scheme:

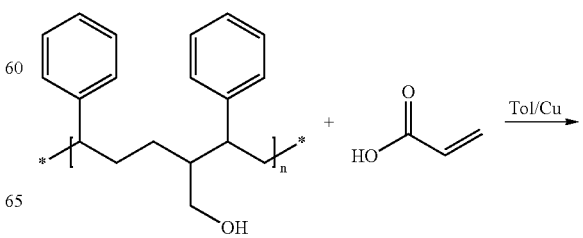

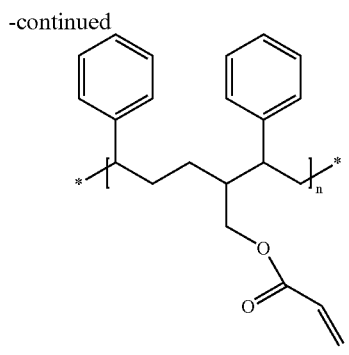

For the purpose of the present invention all acrylated copolymers and monomers may be derived from acrylic acid, methacrylic acid and from alkylacrylates and alkylmethacrylates. For reasons of simplicity these compounds are uniformly called "(meth)acrylated", but it is to be understood that (meth)acrylated copolymers and monomers encompass acrylated and methacrylated copolymers and monomers throughout the present description and claims.

For reasons of processability and handling, SAA copolymer (meth)acrylates are preferably produced in the presence of a diluent. This diluent can be added during (polyol or (meth)acrylated polyol) or after the (meth)acrylation step (only (meth)acrylated polyol). It has been found that alkoxylated (meth)acrylated monomers are particularly suitable as diluents for (meth)acrylated SAA copolymers. Moreover, litho inks based on (meth)acrylated SAA copolymers according to the invention with alkoxylated (meth)acrylated monomers as diluents show exceptional performance compared to state of the art UV inks for water balance and pigment wetting. Additionally, depending on the alkoxylated (meth)acrylated monomer a composition exhibiting a very high cure speed can be obtained.

Besides the SAA and the diluent, other components such as an acidic component, preferably a fatty acid, can be added during the synthesis to modify the properties. The quantity of fatty acid added is generally from 0 to 50% by weight based on the total weight of copolymer and monomer.

The (meth)acrylated styrene allyl alcohol copolymers used in the composition according to the invention is preferably obtained from the reaction of a styrene allyl alcohol copolymer (SAA) with acrylic acid. Most preferred is a acrylated styrene allyl alcohol copolymer obtained from the acrylation of a styrene allyl alcohol copolymer with acrylic acid in the presence of an alkoxylated polyol so that both the styrene allyl alcohol copolymer and the alkoxylated polyol are acrylated simultanously.

A monomer is herein defined as a component able to be further polymerized. It can be di- or tri-functional but also tetra, penta or even hexafunctional.

Generally, the composition of the present invention should comprise the minimum amount of 10% by weight, more preferably a minimum amount of 40% by weight and most preferably a minimum amount of 50% by weight alkoxylated (meth)acrylated monomer, based on the total weight of the (meth)acrylated SAA copolymer and the monomer. For example the composition may comprise 10-90% by weight (meth)acrylated SAA copolymer and 10-90% by weight alkoxylated (meth)acrylated monomer, preferably 40-70% by weight (meth)acrylated SAA copolymer and 30-60% by weight alkoxylated (meth)acrylated monomer, each based on the total weight of copolymer and monomer.

The alkoxylated (meth)acrylated monomer used in the compositions of the present invention are those currently used in radiation-curable compositions. They can for example be obtained from mono-, di-, tri- and polyhydroxy compounds being alkoxylated and (meth)acrylated. The preferred alkoxylates are ethoxylates and propoxylates or mixtures thereof. Each of the hydroxy groups of the hydroxy compounds may bear one or more, preferably at least 2, alkoxy repeating units. The number of alkoxy repeating units on each hydroxy group generally does not exceed 10, preferably not 5.

Advantageously, the alkoxylated (meth)acrylated monomer used in the composition of the present invention is selected from the group consisting of alkoxylated triol tri(meth)acrylates, alkoxylated diol di(meth)acrylates, and more particularly alkoxylated (meth)acrylated bisphenol A derivatives. Preferably, the alkoxylated (meth)acrylated monomer is chosen from ethoxylated glycerol tri(meth)acrylates, propoxylated glycerol tri(meth)acrylates, ethoxylated neopentylglycol di(meth)acrylates, propoxylated neopentylglycol di(meth)acrylates, ethoxylated trimethylolpropane tri(meth)acrylates, propoxylated trimethylolpropane tri(meth)acrylates, (meth)acrylated bisphenol A ethoxylates, (meth)acrylated bisphenol A propoxylates, alkoxylated ditrimethylolpropane tetra(meth)acrylates, alkoxylated pentaerythritol tetra(meth)acrylates, alkoxylated dipentaerythritol penta/hexa (meth)acrylates. Particularly preferred monomer diluents are (meth)acrylated bisphenol A alkoxylates such as acrylated bisphenol A ethoxylate, available as Ebecryl™ 150 from Surface Specialties-UCB. Propoxylated glycerol triacrylate is for example available under the trademark OTA480.

The radiation-curable composition of the present invention is useful as ink vehicle for the preparation of inks, such as UV-litho inks. Therefore, the composition may further comprise one or more compounds selected from pigments, photoinitiators, and ink additives.

The pigments used in the compositions of the invention are those pigments generally used in paste or liquid inks. A list of such pigments can be found in the Color Index. More particularly, those pigments may be cited such as Process Yellow 13 (Diarylide Yellow-Irgalite BAW of Ciba, Permanent GR of Clariant), Process Magenta Pigment 57 (Bona Calcium-Ilobona 4BY of Sun, Irgalite SMA of Ciba), Process Blue 15.3 (Copper Phthalocyanine-Irgalite GLO of Ciba, Hostaperm Blue B2G of Clariant), Process Black 7 (Oxidised Carbon Black-Special Black 250; Special Black 350 of Degussa), etc. The pigments are preferably used at 1-50% by weight of the total weight of the composition, more preferably at 1-40% by weight.

The photoinitiators usable in the compositions of the invention are well known in the art. They can be chosen from α-hydroxyketones, α-aminoketones, benzildimethyl-ketals, acyl phosphines, benzophenone derivatives, thioxanthones and blends of these. They are used at 0 to 15% by weight. Photoactivators are generally chosen between amine derivatives. The photoinitiators need only be used if the compositions are cured by ultraviolet light. The compositions may also be cured by electron beams rays, and, in this case, no photoinitiator needs to be added to the composition.

The additives are those commonly used in inks, such as stabilizers, substrate wetting agents, anti-foam agents, adhesion promoters, dispersing agents etc.

Preferably, the composition of the present invention comprises a minimum amount of 40% by weight, more preferably a minimum amount of 50% by weight, of (meth)acrylated SAA copolymer and alkoxylated (meth)acrylated monomer, based on the total weight of the composition.

The compositions of the present invention may comprise each one (meth)acrylated SAA copolymer and one alkoxylated (meth)acrylated monomer or, if desired, two or more different (meth)acrylated SAA copolymers and two or more different alkoxylated (meth)acrylated monomers.

The compositions of the present invention can be prepared by (meth)acrylating SAA copolymer as described above by (meth)acrylating the SAA copolymer with (meth)acrylic acid or with an alkyl(meth)acrylate, in the presence of a solvent. Work-up of the reaction product is, however, difficult due to the high viscosity of the (meth)acrylate. To ensure efficient washes and phasing of the (meth)acrylated SAA copolymer, a diluent in the form of the alkoxylated (meth)acrylated monomer can be added directly after (meth)acrylation, but before the solvent removal ((meth)acrylation of SAA with post dilution with (meth)acrylated polyols or "post dilution process"). In a variant, the SAA can be (meth)acrylated in presence of (meth)acrylated polyols. It has now surprisingly been found that if the SAA copolymer and the diluent in the form of an alkoxylated polyol monomer are (meth)acrylated simultaneously in-situ (co-acrylation process) better properties can be obtained such as ink water balance. The positive impact on monomer hydroxyl conversion of the co-acrylation process compared to the post dilution process is demonstrated by the LCMS data summarized in the following table 2:

| Resin | Process | SAA | Diluent Type | % | Monomer composition (LC area %) | | |
|---|---|---|---|---|---|---|---|
| | | | | | Mono | Di | Tri |
| 1 | Co-acrylation | 103 | OTA480 | 50 | 0.8 | 5.4 | 93.8 |
| 2 | Post-dilution | 103 | OTA480 | 50 | 1.2 | 10.4 | 88.4 |
| 3 | Co-acrylation | 100 | Eb150 | 60 | 7 | 93 | NA |
| 4 | Post-dilution | 100 | Eb150 | 60 | 14 | 86 | NA |
| 5 | Co-acrylation | 103 | Eb150 | 70 | 5 | 95 | NA |
| 6 | Post-dilution | 103 | Eb150 | 70 | 12 | 88 | NA |

The above table shows that bisphenol A ethoxylate (Ebecryl™ 150) is less monoacrylated and propoxylated glycerol (OTA480) is less mono- and diacrylated (based on LC % area) in the co-acrylation process compared to the post dilution process. While applicant does not wish to be bound to any theory, it is believed that this effect can probably explain the improvement in the ink-water balance of compositions prepared according to the co-acrylation process compared to the compositions prepared according to the post dilution process.

Remarkably, there is also a difference in appearance when the co-acrylation process is used. The obtained resin is much less colored.

Furthermore, the cure speed of the compositions of the present invention has been measured in a cyan ink with 8% photoinitiator blend (32% EDB/13% DETX/7% Irgacure369/14% benzophenone/34% BDK) under a 120 Wcm Hg lamp by graphite test. The results are summarized in the following table 2a:

| SAA | Process | Diluent | Alkoxylation | Cure speed m/min |
|---|---|---|---|---|
| 100 | co-acrylation | EB150:65% | OE | 100 |
| 100 | post dilution | EB150:60% | OE | 90 |
| 100 | co-acrylation | EB150:60% | OE | 90 |
| 100 | co-acrylation | OTA480:45% | OP | 40 |
| 100 | co-acrylation | BisA(OP)2DA | OP | 70 |
| 100 | co-acrylation | BisA(OP)4DA | OP | 60 |
| 100 | co-acrylation | TMP(EO)3TA | OE | 25 |
| 103 | co-acrylation | EB150:70% | OE | 110 |
| 103 | post dilution | EB150:70% | OE | 90 |
| 103 | post dilution | OTA480:50% | OP | 20 |

It can be seen from the above table 2a that the cure speed is not significantly influenced by the process used (co-acrylation or post dilution). Surprisingly, cure speed of Bisphenol A monomers is greater than for other monomers such as OTA 480 or alkoxylated TMPTA. Among the Bisphenol A monomers, ethoxylated Bisphenol A monomers have a higher cure speed and are thus preferred over propoxylated Bisphenol A monomers.

Inks are generally made in 2 steps, the pigment dispersion step and the letdown step. In the 1st step, all the pigments are added in the pigment dispersing binders (oligomers and monomers). They are mixed and then dispersed on a triple roll or bead mill. A few passes are necessary to achieve a good dispersion. Pigments that are difficult to disperse require more number of passes. It is the same with the binders. Binders that are not good for pigment wetting also require additional passes. Once the pigment has achieved this fineness, the pigment paste is diluted with the letdown. The letdown has to be compatible with the binder used to disperse the pigments. The finished ink is then printed onto the substrate. The ink film is then cured under a UV lamp, for example at 120 W/cm and 30 m/min. A few passes may be required to cure the ink if the binder is not reactive enough.

The invention also relates to the polymeric compositions obtainable by curing the radiation curable composition as well as to substrates being partially or entirely coated with the polymeric composition.

Pigment wetting can be evaluated by different methods:
  Rheology: Pigment wetting is a major factor of influence on the rheology. Inks with bad wetting of the pigment are showing a marked shear thinning effect, whereby the viscosity is high at low shear rate and drops as the shear rate is increased. This results in a high shortness index (SI=ratio of low shear viscosity to high shear viscosity. For liquid inks a Newtonian rheology is required. Ideally, this means that the viscosity is independent of the shear rate. (SI=1). Paste inks are more pseudoplastic, showing a shear depending viscosity. (SI>1). Too high SI (too high low shear viscosity) may result in bad flow in the ink duct.

The rheology is measured with cone and plate type rheometers.

Optical density: Pigment wetting can also be evaluated by measuring the color density of the printed ink at constant film thickness. In this case the ink is printed using a lab applicator and the color density is measured with a densitometer, which spectrophotometrically compares the reflected light to the incident light.

For the present invention the pigment wetting is rated on a scale from 5=excellent to 0=bad pigment wetting.

The water balance of the compositions of the present invention was evaluated on lithotronic. Basically, the Lithotronic measures the torque needed for a certain speed (rpm). The torque gives a measure for viscosity. With the Lithotronic, the change in viscosity of an ink is measured when water is emulsified in it.

The measurement consists of two phases: preconditioning and measurement.

During preconditioning, the sample is sheared at constant speed and heated at the same time to a certain preprogramed temperature. At the end of the preconditioning phase, the sample has reached a stable viscosity. At that moment, controlled metering of fount solution is started. Changes of applied torque (hence viscosity) versus time and emulsion capacity are recorded. When maximum emulsion capacity is reached, a drop in torque is usually experienced because of the free water in the beaker.

At first contact with water, change of torque (delta T) should be small. Further, when water is emulsified in the ink, viscosity should only undergo a minor increase. This ensures a good ink transfer on the press. If the emulsion is too fine and too stable (too high increase of viscosity), it will lead to a loss of density and possible ink build up. If the emulsion is too coarse (viscosity decrease), it can lead to unstable press behaviour making regular press control necessary.

For the present invention the ink water balance is rated by the type of emulsion (F=good ink water balance characterized by a limited viscosity increase, resulting from a fine emulsion; C=bad ink water balance characterized by a high viscosity decrease, resulting from a coarse emulsion).

The invention will now be illustrated by the following non-limiting examples and tests which are by way of illustration only. Unless otherwise indicated, herein all the test results and properties herein were performed using conventional methods well known to those skilled in the art. The amounts in the tables are given in % by weight based on the total weight of the composition.

The compositions of the present invention were prepared according to the following production examples:

COMPOSITION 1

A reactor was charged with 524 grams of SAA-100 from Lyondell (1,96 eq), 921,4 grams Simulsol BPJE (ethoxylated bisphenol A from Seppic-Air Liquide) (4,60 eq), 496,4 grams acrylic acid (6,89 eq), 1295 grams toluene, 48,5 grams para-toluenesulphonic acid, 0.50 grams $Cu_2O$, 9,7 grams hypophosphorous acid. The reactor content was heated at 120° C. until the rate of reaction slows down as measured by collection of the esterification water. After about 8 to 10 hrs when the acid value was less than 15, the reactor was cooled down to 50° C. and diluted with toluene till a 1/1 reactant:solvent ratio. The reactor was charged with an aqueous solution of 15% sodium chloride and stirred for 2 minutes. Phases were let to separate at 40-50° C. and the aqueous phase decanted. Ssaline washes were repeated until an acid value of 5 was reached. The reactor was charged with a caustic solution of 5% NaOH in an amount of 25% of the batch weight and stirred for 2 minutes. Phases were separated at 40° C. and the aqueous layer was decanted. Then 1,8 grams HQ and 3,6 grams trisnonylphenylphosphite were added and heated till 120° C. to distill the remaining water. An airsparge of 1 l/hr was maintained. When the water content was below 0,1% the reactor was cooled down for filtration. After distillation of the toluene at 90° C. and a reduced pressure of 30 mbar, a product A1 with a Cone & Plate viscosity of 33 Pas and an acid value of 0,7 mg KOH/g was obtained.

COMPOSITION 2

A reactor was charged with 399,9 grams of SAA-103 from Lyondell (0,90 eq), 65,0 grams acrylic acid (0,90 eq), 313 grams toluene, 11,8 grams para-toluenesulphonic acid, 0,07 grams $Cu_2O$, 2,35 grams hypophosphorous acid. The reactor content was heated at 120° C. until the rate of reaction slowed down as measured by collection of the esterification water. After about 8 to 10 hrs when the acid value was less than 15, it was cooled down to 50° C. and diluted with toluene till a 1/1 reactant:solvent ratio. The reactor was charged with an aqueous solution of 15% sodium chloride and stirred for 2 minutes. Phases were let to separate at 40-50° C. and the aqueous phase decanted. Saline washes were repeated until an acid value of 5 was reached. The reactor was charged with a caustic solution of 5% NaOH in an amount of 25% of the batch weight and stirred for 2 minutes. Phases were separatde at 40° C. and the aqueous layer decanted. Then, 1050 grams acrylated bisphenol ethoxylate (EB 150 from Surface Specialties—UCB), 1,5 grams HQ and 3,0 grams trisnonylphenylphosphite were added and heated till 120° C. to distill the remaining water. An airsparge of 1 l/hr was maintained. When the water content was below 0,1% the reactor was cooled down for filtration. After distillation of the toluene at 90° C. and a reduced pressure of 30 mbar, a product B1 with a Cone & Plate viscosity of 53 Pas and an acid value of 1,05 mg KOH/g was obtained.

Further compositions were prepared according to the above production examples. The following compositions (products A1-A5 and B1-B2) were obtained according to the invention:

TABLE 3

| Example | SAA copolymer | Diluent Type | level | Viscosity Pas; 25° C. C&P | Acid value Mg KOH/g |
|---|---|---|---|---|---|
| Product A1 | SAA 100 | Bis A (EO)4 DA | 65% | 33 | 0.7 |
| Product A2 | SAA 100 | Bis A (PO)2 DA | 80% | 75 | 0.8 |
| Product A3 | SAA 100 | Bis A (PO)4 DA | 75% | 130 | 0.8 |
| Product A4 | SAA 100 | TMP (EO)3 TA | 45% | 40 | 1.2 |
| Product A5 | SAA 100 | Glycerol (PO)3 TA | 45% | 87 | 0.8 |
| Product B1 | SAA 103 | Bis A (EO)4 DA | 70% | 53 | 1.05 |
| Product B2 | SAA 103 | Glycerol (PO)3 TA | 50% | 117 | 0.8 |

In the above table 3 the following abbreviations are used:
Bis A: bisphenol A
TMP: trimethylolpropane
EO: ethyleneoxide
PO: propyleneoxide
DA: diacrylate
TA: triacrylate
C&P: Cone and Plate The following comparative compositions were prepared as well:

TABLE 4

| Example | Polymer | Diluent Type | level | Viscosity Pas; 25° C. C&P | Acid value Mg KOH/g |
|---|---|---|---|---|---|
| Product C1 | SAA 100 | TMPTA | 50% | 33 | 0.9 |
| Product C2 | SAA 100 | HDDA | 30% | 75 | 0.9 |
| Product C3 | PEA:Eb657 | NA | NA | 130 40 | <15 |
| Product C4 | PEA:Eb811 | NA | NA | 87 | <1 |

In the above table 4 the following abbreviations are used:
PFA:Eb657: Polyester acrylate Ebecryl™ 657
PEA:Eb811: Polyester acrylate Ebecryl™ 811
TMPTA: trimethylolpropane trimethacrylate
HDDA: Hexane diol diacrylate
NA: not applicable.

With the above compositions and comparative compositions the following ink formulations were prepared:

TABLE 5

|  | A1 | A2 | A3 | A4 | A5 | B1 | B2 | C1 | C2 | C3 | C4 |
|---|---|---|---|---|---|---|---|---|---|---|---|
| Oligomer | 64 | 50 | 62 | 59 | 60 | 58 | 58 | 64 | 66 | 57 | 60 |
| Stab | 1 | 1 | 1 | 1 | 1 | 1 | 1 | 1 | 1 | 1 | 1 |
| PB 15:3 | 17 | 17 | 17 | 17 | 17 | 17 | 17 | 17 | 17 | 17 | 17 |
| Talc | 6 | 6 | 6 | 6 | 6 | 6 | 6 | 6 | 6 | 6 | 6 |
| PI blend | 8 | 8 | 8 | 8 | 8 | 8 | 8 | 8 | 8 | 8 | 8 |
| OTA480 |  |  |  |  | 8 |  | 10 |  |  | 11 | 8 |
| TMPTA |  |  |  |  |  |  |  | 4 |  |  |  |
| HDDA |  |  |  |  |  |  |  |  | 2 |  |  |
| TMP(EO)3TA |  |  |  | 9 |  |  |  |  |  |  |  |
| Ebecryl ™ 150 | 4 |  |  |  |  | 10 |  |  |  |  |  |
| BPA(OP)2DA |  | 18 |  |  |  |  |  |  |  |  |  |
| BPA(OP)4DA |  |  | 6 |  |  |  |  |  |  |  |  |

Stab: polymerisation inhibitor (5% solution of NPAL in DPGDA (DiPropyleneGlycolDiAcrylate);
NPAL = Tris(N-nitroso-N-phenylhydroxylamine)aluminium salt)
PB15:3 = phtalocyanine pigment (Irgalite ™ GLO from Ciba)

Various properties of the obtained ink formulations were measured. The results are summarized in the following table 6:

TABLE 6

|  | A1 | A2 | A3 | A4 | A5 | B1 | B2 | C1 | C2 | C3 | C4 |
|---|---|---|---|---|---|---|---|---|---|---|---|
| Visco 2.5 s-1 | 62.2 | 61.5 | 63.0 | 75.0 | 73.1 | 58.1 | 76.8 | 71.2 | 131 | 72.0 | 71.0 |
| Visco 100 s-1 | 35.1 | 34.8 | 33.1 | 34.5 | 34 | 32.5 | 34.3 | 30.4 | 37.6 | 30.0 | 30.2 |
| SI | 1.8 | 1.8 | 1.9 | 2.2 | 2.1 | 1.8 | 2.2 | 2.3 | 3.5 | 2.4 | 2.4 |
| Optical Density | 2.05 | 1.99 | 2.08 | 1.98 | 2.08 | 2.08 | 2.13 | 2.1 | 1.7 | 1.95 | 2.04 |
| Pigment wetting | 4 | 4 | 4 | 3 | 3 | 4 | 3 | 2 | 1 | 2 | 2 |
| Delta T | 9 | 8 | 8 | 9 | 12 | 9 | 8 | 9 | 5 | 23 | 20 |
| Emulsion | F | F | F | F | F | F | F | C | C | C | C |
| Cure speed | 100 | 70 | 60 | 25 | 40 | 110 | 30 | 40 | 50 | 20 | 20 |

Cure speed: m/min at 120 W/cm (graphite test)

Furthermore, a comparison between product A1 of the present invention and an ink formulation based on polyester-acrylate (Ebecryl657) was conducted with various pigments. The ink formulations prepared are summarized in the following table 7:

TABLE 7

|  | Black | | Cyan | | Magenta | | Yellow | |
|---|---|---|---|---|---|---|---|---|
|  | A1 | Eb657 | A1 | Eb657 | A1 | Eb657 | A1 | Eb657 |
| Oligomer | 63.5 | 59 | 64 | 57 | 64 | 59 | 68 | 64 |
| Stab | 1 | 1 | 1 | 1 | 1 | 1 | 1 | 1 |
| P. Black 7 | 20 | 20 |  |  |  |  |  |  |
| P. Blue 15:3 |  |  | 17 | 17 |  |  |  |  |
| P. Red 57:1 |  |  |  |  | 18 | 18 |  |  |
| P. Yellow 13 |  |  |  |  |  |  | 14 | 14 |
| P. Blue 61:1 | 1.5 | 1.5 |  |  |  |  |  |  |
| Talc |  |  | 6 | 6 | 3 | 3 | 3 | 3 |
| PI blend | 8 | 8 | 8 | 8 | 8 | 8 | 8 | 8 |
| OTA480 |  | 10.5 |  | 11 |  | 11 |  | 10 |
| Eb150 | 6 |  | 4 |  | 6 |  | 6 |  |

Various parameters of the obtained inks were measured. The results are summarized in the following table 8:

TABLE 8

|  | Black | | Cyan | | Magenta | | Yellow | |
|---|---|---|---|---|---|---|---|---|
|  | A1 | Eb657 | A1 | Eb657 | A1 | Eb657 | A1 | Eb657 |
| Visc. 2.5 s-1 | 55.9 | 102 | 62.2 | 72.0 | 40.3 | 60.1 | 97.4 | 87 |
| Visc. 100 s-1 | 32.1 | 31.7 | 35.1 | 30.0 | 33.9 | 33.4 | 34.8 | 34.8 |
| SI | 1.7 | 3.2 | 1.8 | 2.4 | 1.2 | 1.8 | 2.8 | 2.5 |
| Optical density | 2.35 | 1.59 | 2.05 | 1.95 | 1.8 | 1.84 | 1.65 | 1.60 |
| Pigment wetting | 4 | 0 | 4 | 2 | 5 | 3 | 2 | 2 |
| Delta T (%) | 9 | 19 | 9 | 23 | 6 | 10 | 7 | 20 |
| Emulsion | F | C | F | C | F/C | C | F | C |
| Cure speed | 70 | 30 | 100 | 20 | 80 | 30 | 70 | 20 |

Cure speed: m/min at 120 W/cm (graphite test)

The above results demonstrate that the compositions of the present invention exhibit an improved water balance and an improved pigment wetting compared to acrylated SAA copolymer-based ink vehicles which do not comprise an alkoxylated acrylated monomer and an improved water balance and an improved pigment wetting compared to polyester acrylate ink vehicles. Moreover, the cure speed of the radiation-curable composition according to the present invention can be higher compared to the known compositions depending on the alkoxylated acrylated monomer employed.

The invention claimed is:

1. Radiation-curable composition, comprising (a) at least one (meth)acrylated styrene allyl alcohol copolymer obtained from the (meth)acrylation of a styrene allyl alcohol (SAA) copolymer with (meth)acrylic acid and/or one or more alkyl (meth)acrylates, and (b) at least one alkoxylated acrylated monomer obtained from alkoxylated and (meth)acrylated di-, tri- and polyhydroxy compounds.

2. Composition according to claim 1, comprising 10-90% by weight (meth)acrylated SAA copolymer and 10-90% by weight alkoxylated (meth)acrylated monomer, each based on the total weight of the (meth)acrylated SAA copolymer and alkoxylated (meth)acrylated monomer.

3. Composition according to claim 1, wherein the alkoxylated (meth)acrylated monomer is selected from the group consisting of alkoxylated triol tri(meth)acrylates, alkoxylated diol di(meth)acrylates.

4. Composition according to claim 1, wherein the alkoxylated (meth)acrylated monomer is selected from the group consisting of ethoxylated glycerol tri(meth)acrylates, propoxylated glycerol tri(meth)acrylates, ethoxylated neopentylglycol di(meth)acrylates, propoxylated neopentylglycol di(meth)acrylates, ethoxylated trimethylolpropane tri(meth)acrylates, propoxylated trimethylolpropane tri(meth)acrylates, (meth)acrylated bisphenol A ethoxylates, (meth)acrylated bisphenol A propoxylates, alkoxylated ditrimethylolpropane tetra(meth)acrylates, alkoxylated pentaerythritol tetra(meth)acrylates and alkoxylated dipentaerythritol penta/hexa (meth)acrylates.

5. Composition according to claim 1, further comprising one or more compounds selected from pigments, photoinitiators, and ink additives.

6. Process of preparing a radiation-curable composition, comprising
   a) admixing a styrene allyl alcohol (SAA) copolymer with at least one alkoxylated polyol and
   b) simultaneously in situ co-(meth)acrylating the mixture obtained under a) in order to obtain a composition according to claim 1.

7. Radiation-curable composition obtained by the process of claim 6.

8. Ink Vehicle or ink containing the radiation-curable composition as claimed in claim 1.

9. Polymeric composition obtained by curing the radiation-curable composition as claimed in claim 1.

10. Substrate partially or entirely coated with the polymeric composition as claimed in claim 9.

11. Composition according to claim 3 wherein the alkoxylated (meth)acrylated monomer is selected from alkoxylated (meth)acrylated bisphenol A derivatives.

* * * * *

UNITED STATES PATENT AND TRADEMARK OFFICE
CERTIFICATE OF CORRECTION

| | | |
|---|---|---|
| PATENT NO. | : 7,423,092 B2 | Page 1 of 1 |
| APPLICATION NO. | : 10/561813 | |
| DATED | : September 9, 2008 | |
| INVENTOR(S) | : Isabelle Fallais et al. | |

It is certified that error appears in the above-identified patent and that said Letters Patent is hereby corrected as shown below:

<u>In the specification:</u>
Column 1, lines 59 and 61, change "met" to --meth--.

<u>In the Claims:</u>
Claim 1, line 16, column 11, change "acrylated" to --(meth)acrylated--.

Signed and Sealed this
Twenty-second Day of March, 2011

David J. Kappos
*Director of the United States Patent and Trademark Office*